(12) United States Patent
Such

(10) Patent No.: US 7,293,041 B2
(45) Date of Patent: Nov. 6, 2007

(54) TOKEN-BASED OBJECT DESCRIPTION

(75) Inventor: Ondrej Such, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 844 days.

(21) Appl. No.: 10/413,238

(22) Filed: Apr. 11, 2003

(65) Prior Publication Data

US 2003/0182466 A1  Sep. 25, 2003

Related U.S. Application Data

(63) Continuation of application No. 09/217,402, filed on Dec. 21, 1998, now Pat. No. 6,615,280.

(51) Int. Cl.
*G06F 7/00* (2006.01)
*G06F 9/46* (2006.01)

(52) U.S. Cl. ............... 707/103 R; 719/316; 719/328; 719/331

(58) Field of Classification Search ............... 707/1–6, 707/100–104.1; 717/116, 161–165; 719/316, 719/328, 315, 331, 332
See application file for complete search history.

(56) References Cited

U.S. PATENT DOCUMENTS

| | | | |
|---|---|---|---|
| 5,432,925 A | | 7/1995 | Abraham et al. |
| 5,615,363 A | * | 3/1997 | Jenness ............ 707/103 R |
| 5,692,180 A | * | 11/1997 | Lee .................. 707/10 |
| 5,790,416 A | * | 8/1998 | Norton et al. ........ 716/11 |
| 5,822,580 A | | 10/1998 | Leung |

OTHER PUBLICATIONS

Appel, A. W., "Testing Class Membership," *Modern Compiler Implementaion in ML*, Cambridge University Press, pp. 300-304, 1998.
Sun Microsystems, "The Java 3D API Technical White Paper," Sun Microsystems, Inc., pp. 21-22, Jul. 1997.

* cited by examiner

*Primary Examiner*—William Thomson
*Assistant Examiner*—Charles E Anya
(74) *Attorney, Agent, or Firm*—Christensen O'Connor Johnson Kindness PLLC

(57) ABSTRACT

Token-based object description is disclosed. In one embodiment, a system includes a plurality of objects and a set of tokens. Each object has at least one attribute, such as a type. Each token is mapped to a unique attribute. Each object is describable utilizing the set of tokens.

16 Claims, 3 Drawing Sheets

TOKEN-BASED OBJECT DESCRIPTION

CROSS-REFERENCE TO RELATED APPLICATION

This application is a continuation of U.S. patent application Ser. No. 09/217,402, filed Dec. 21, 1998, now U.S. Pat. No. 6,615,280.

FIELD

This invention relates generally to the description of software objects, and more particularly to such a description that is token-based, for purposes of dynamic action invocation.

BACKGROUND

Dynamic action invocation is a very powerful software engineering technique. A simple case of it has been popularized by using C++ classes to implement polymorphic handling of window messages in programs running under Microsoft Windows operating system. It is very useful to generalize this technique to handle more general objects, and also handle actions that depend equally on multiple objects.

Software objects have generally become the norm when creating new computer programs. Most current programming languages, such as C++ and Java, provide for the use of software objects. In addition, software methodologies such as that provided for by Microsoft Corp.'s Component Object Model (COM), as known within the art, also provide for the use of software objects. A software object may be defined in a nonexclusive and non-limiting sense as a software component having a number of attributes, such as types and/or parameters. A computer program thus may be defined in a nonexclusive and non-limiting sense as a collection of software objects that interact with one another in accordance with a desired manner.

Usually, the classification, or typing, of these software objects is hierarchical in nature, such that there is an implied transitive relationship between types. Thus if an object is of type A, and type A inherits from B, and objects of type B inherit from C, then the object is considered to be also of types B and C. This may make for inefficient description of objects. That is, describing all aspects of an object's attributes may be inefficient where the object is part of a hierarchical classification of objects in that the resulting description of the object may be overly verbose.

A non-software example is illustrative for purposes of understanding in this regard. An object defined as a tall red flower is considered. This object is (1) a flower, is (2) a red flower, is (3) a tall flower, is (4) tall and red, is (5) tall, is (6) red, and is (7) a tall red flower. Thus, seven different aspects are needed to completely describe the object, making for an inefficient manner by which to describe this object. For these and other reasons, therefore, there is a need for the present invention.

SUMMARY

The above-identified problems, shortcomings and disadvantages with the prior art, as well as other problems, shortcoming and disadvantages, are solved by the present invention, which will be understood by reading and studying the specification and the drawings. In one embodiment, a system includes a plurality of objects and a set of tokens. Each object has at least one attribute, such as one or more types and/or one or more parameters. Each token is mapped to a unique attribute. Thus, each object is describable utilizing the set of tokens.

Thus, embodiments of the invention provide for advantages not found in the prior art. For example, with respect to the example provided in the background section, in one particular embodiment a tall red flower object is describable using three sequentially linked tokens: (1) a tall token, (2) a red token, and (3) a flower token as compared to seven aspects as in the prior art. Thus, flattening a hierarchical-based typing scheme into a token-based description scheme provides for more efficient object description.

The invention includes systems, methods, computers, and computer-readable media of varying scope. Besides the embodiments, advantages and aspects of the invention described herein, the invention also includes other embodiments, advantages and aspects, as will become apparent by reading and studying the drawings and the following description.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system of one embodiment of the invention is presented. In the third section, a method, in accordance with an embodiment of the invention, is provided. Finally, in the fourth section, a conclusion of the detailed description is provided.

Hardware and Operating Environment

Figure 1:
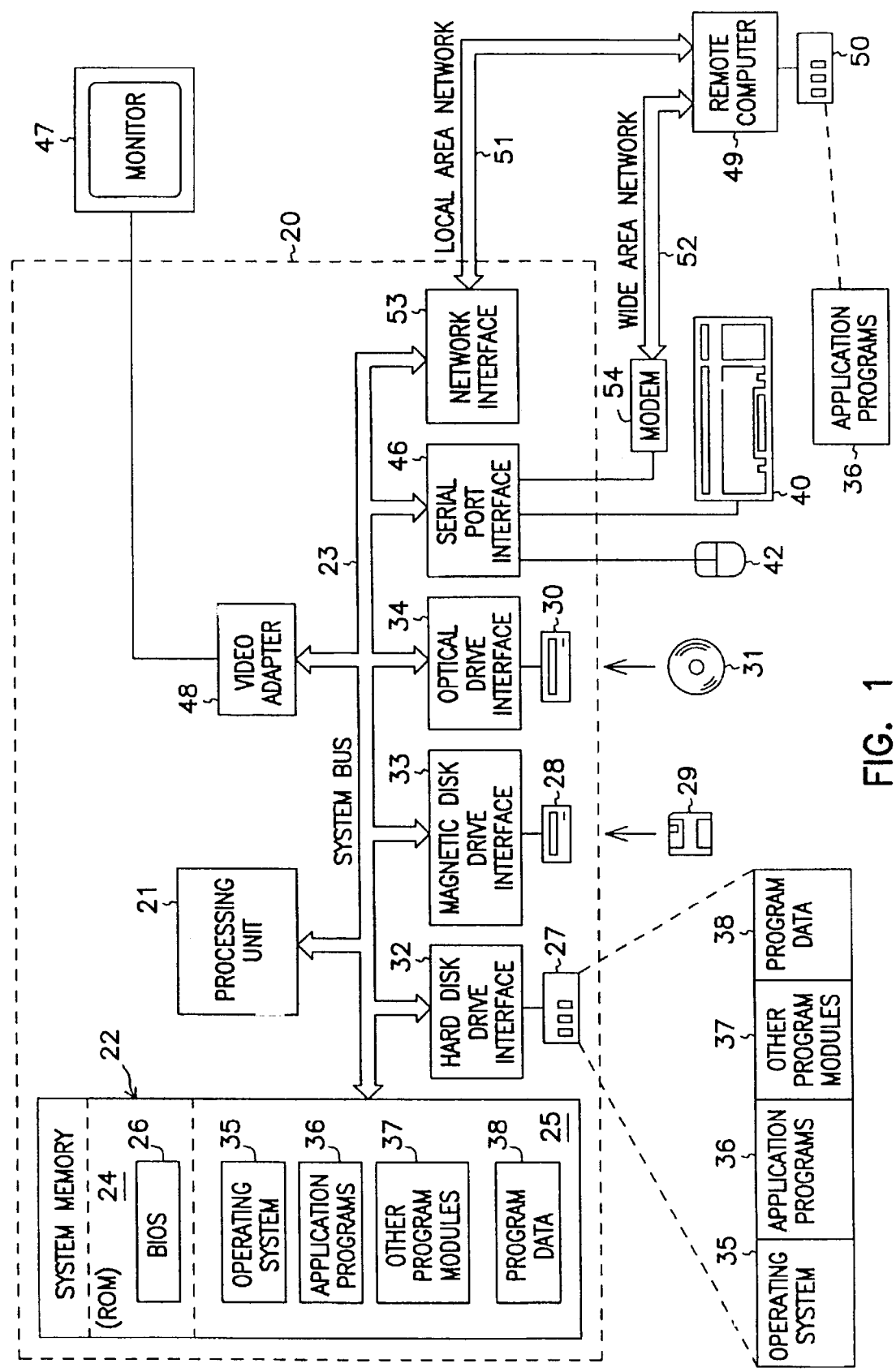
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel.processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System

Figure 2A:
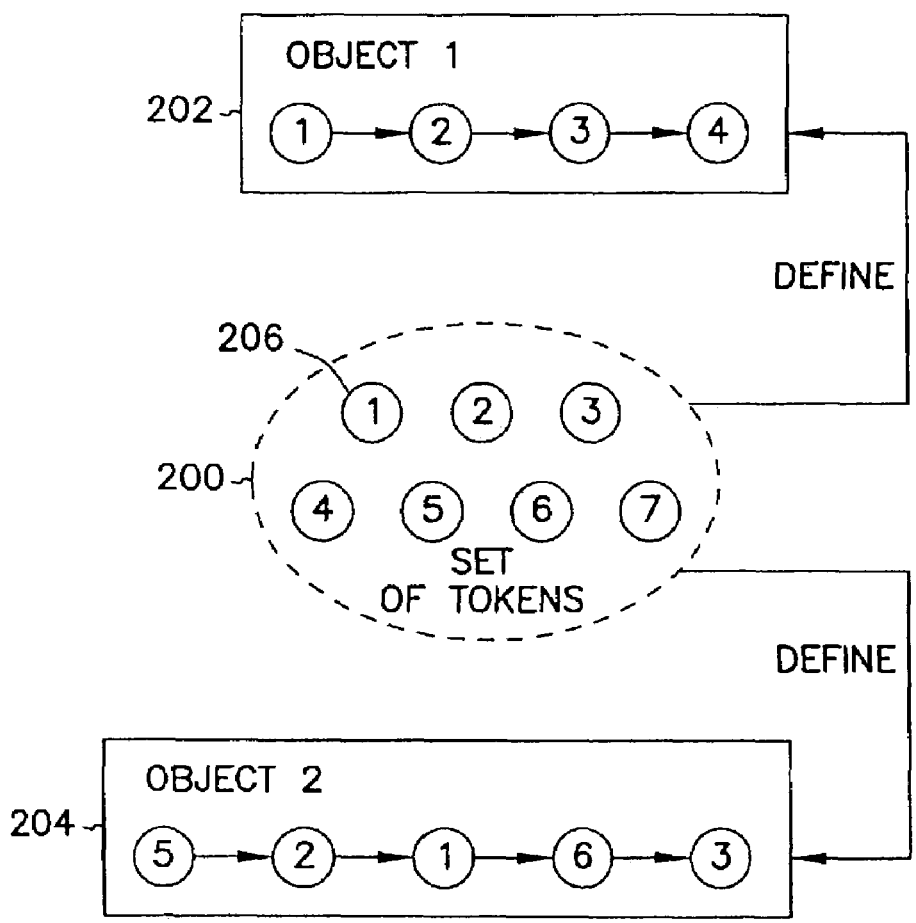
FIG. 2(a) shows a diagram of an object description scheme according to one embodiment of the invention.

In this section of the detailed description, a description of a computerized system according to an embodiment of the invention is provided. The description is provided by reference to FIG. 2(a) and FIG. 2(b). Referring first to FIG. 2(a), a diagram according to an embodiment of the invention is shown. The system of FIG. 2(a) includes a set of tokens 200, a first object 202, and a second object 204. The set of tokens 200 includes seven tokens such as the token 206. Each of these tokens relates to a unique attribute of the objects 202 and 204.

The invention is not particularly limited to the type of the attributes each of the tokens represents. In one embodiment, at least one of the tokens represents an object type of at least one of the objects 202 and 204. Such object types include a Java object, a Component Object Model (COM) object, and a C++ object, or represent a resource provided by an operating system, such as a window, segment of computer memory or a hardware resource, although the invention is not so limited. Other attributes represented by the tokens can include in various embodiments of the invention: parameters of the objects 202 and 204, classes, sub-classes, etc., of these objects, as well as other attributes not listed here.

The number of tokens is the total number of unique attributes found within a plurality of objects, such as the plurality of objects consisting of the object 202 and the object 204. Each unique attribute may be found in more than one of the plurality of objects, however (for example, where two or more of the objects are COM objects). Thus, the total number of tokens is less than or equal to the total number of attributes of all the objects within the plurality of objects.

Thus, the qualitative description of each of the objects 202 and 204 may be represented as a sequence of tokens. That is, each object is describable utilizing the set of tokens. For example, the object 202 mathematically is represented as a series of tokens: 1≡2≡3≡4≡. This means that the object 202 has the attributes represented by tokens 1, 2, 3 and 4, in that order. Thus, insofar as the object 202 may have been previously represented in accordance with a hierarchical type scheme, in accordance with the embodiment shown in FIG. 2(a), the object 202 is also represented in a flat (non-hierarchical) manner by the tokens 1, 2, 3 and 4 in that order.

Similarly, the object 204 is mathematically represented as a series of tokens: 5≡2≡1≡6≡3≡. This means that the object 204 has the attributes represented by tokens 5, 2, 1, 6 and 3, in that order. Insofar as the object 204 may have been previously represented in accordance with a hierarchical type scheme, in accordance with the embodiment shown in FIG. 2(a), the object 204 is also represented in a flat (non-hierarchical) manner by these tokens in the order given.

The token-based flat object description of embodiments of the invention thus provides for a more efficient manner by which to describe objects. Rather than describing the objects via reference to a hierarchical tree structure in which the structure may have to be traversed in order for the objects to be described (including the relationships, for example, of the various attributes of the objects as indicated by the tree structure), the flat token-based object description of embodiments of the invention does not require any such traversal, and the relationships are implied as to the sequence of the tokens. This is thus more efficient than is found in the prior art.

Another distinguishing feature of the token based recognition scheme is its dynamic character. Unlike type based languages, objects are not necessarily of a given type throughout their whole lifetime. This allows for adjustment of the description of an object, if one of its characteristics is added, modified or deleted, but the object itself is essentially continuing. While token-based description of objects solves the data structure layout of description of objects, it in itself does not provide an algorithm for efficient recognition of objects based on the description.

Figure 2B:
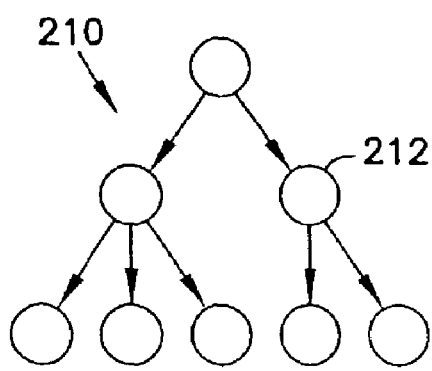
FIG. 2(b) shows a directed acyclical graph of an application programming interface according to one embodiment of the invention; and, FIG. 3 shows a flowchart illustrating a method according to one embodiment of the invention.

Referring next to FIG. 2(b), a directed acyclical graph (DAG) of an application programming interface (API) is shown. The API represented in the DAG 210 of FIG. 2(b) is not limited to any particular API, and such APIs are known within the art. The DAG is made up of a number of nodes, such as the node 212. By utilizing these nodes, the DAG may be used in accordance with the object descriptions of FIG. 2(a) to determine if a given object fits as a parameter within the API represented by the DAG 210. Thus, the objects are such that they can be tested for fit as to an API without traversing a hierarchical type structure. Construction of such an acyclical graph provides for solution of several problems. Firstly, it allows for safe multithreaded operation of the recognition scheme in situations when a mutex (mutually exclusive right) is asserted whenever a comparison happens against a node in the graph. Secondly, in situations when multiple objects are to be recognized at the same time, structuring the recognition problem into small subtasks allows for increased instruction and data cache utilization, ultimately resulting in higher recognition throughput.

This is accomplished by having each node, such as the node 212, of the DAG 210 representing a different microcomp. The microcomp of each node is a micro computation, and points to one or more other nodes, such that the next node proceeded to within the DAG is based on the outcome of the current microcomp as applied to the token-based description of a given object. The invention is not particularly limited to a given type or number of microcomps that may be represented by the nodes. Thus, the DAG 210 may utilize a set of tokens.

For example, one microcomp may be to examine the nth token of a given object to determine if that token represents a desired object type. If it does, then the microcomp may point to another node that indicates a finishing conclusion. Otherwise, this object does not fit the API that the DAG represents. Alternatively, the microcomp may point to a node having a microcomp that requires further processing of the object, to determine if it fits the API represented by the DAG. Thus, by going through the DAG relative to a given object, embodiments of the invention provide for testing of objects against an API in an efficient manner. The set of tokens and one or more objects of FIG. 2(a), along with the DAG of FIG. 2(b), can in one embodiment be part of a system according to the invention.

Other microcomps that can be represented by nodes of the DAG (although, again, the invention is not so limited) include the following: a compared fixed multiple microcomp, a compare float set microcomp, a compare float sequence microcomp, a switch multiple microcomp, a posix call succeeded microcomp, an OLE call succeeded microcomp, and a match succeeded on position n microcomp. Each of these is now briefly described in turn.

The compare fixed multiple microcomp determines whether or not a given object has a given token(s) at a given position. This microcomp has typically two successors corresponding to true and false results of the comparison. The compare float set microcomp determines whether or not a given object has a given set of tokens at any position; this microcomp has usually two successors as well.

The compare float sequence microcomp determines whether or not a given object has a given sequence of tokens, and may have multiple successors indicating position at which a match was found. The switch multiple (this microcomp is also described by Andrew W. Appel: Modern Compiler Implementation in ML: Section 14.4 Testing Class Membership pg.301, ISBN 0-521-58274-1, which is hereby incorporated by reference) is an equivalent of the switch statement found in the C programming language, with value being the token at a given position.

The posix call succeeded microcomp is 0 or 1 depending whether or not a function returned with 0 or a nonzero value, respectively. The OLE call succeeded microcomp is 0 or 1 depending on whether or not the OLE-defined SEVERITY flag, as known within the art, is 0 or nonzero, respectively. Finally, the match succeeded on position n microcomp is typically unique to asynchronous programming environments, and generally has multiple successors.

Method

In this section of the detailed description, a method according to an embodiment of the invention is presented. This description is provided in reference to FIG. 3. The computerized method is desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution-and installation and execution on another (suitably equipped) computer.

Thus, in one embodiment, a computer program is executed by a an object fits an application programming interface (API) by applying a description of the object against a directed acyclical graph (DAG) for the API. The description of the object utilizes a set of tokens, where each token is mapped to a unique attribute of a plurality of objects including this object, and the DAG for the API maps the API utilizing the set of tokens (as, for example, part of the microcomps of the nodes of the API).

Figure 3:
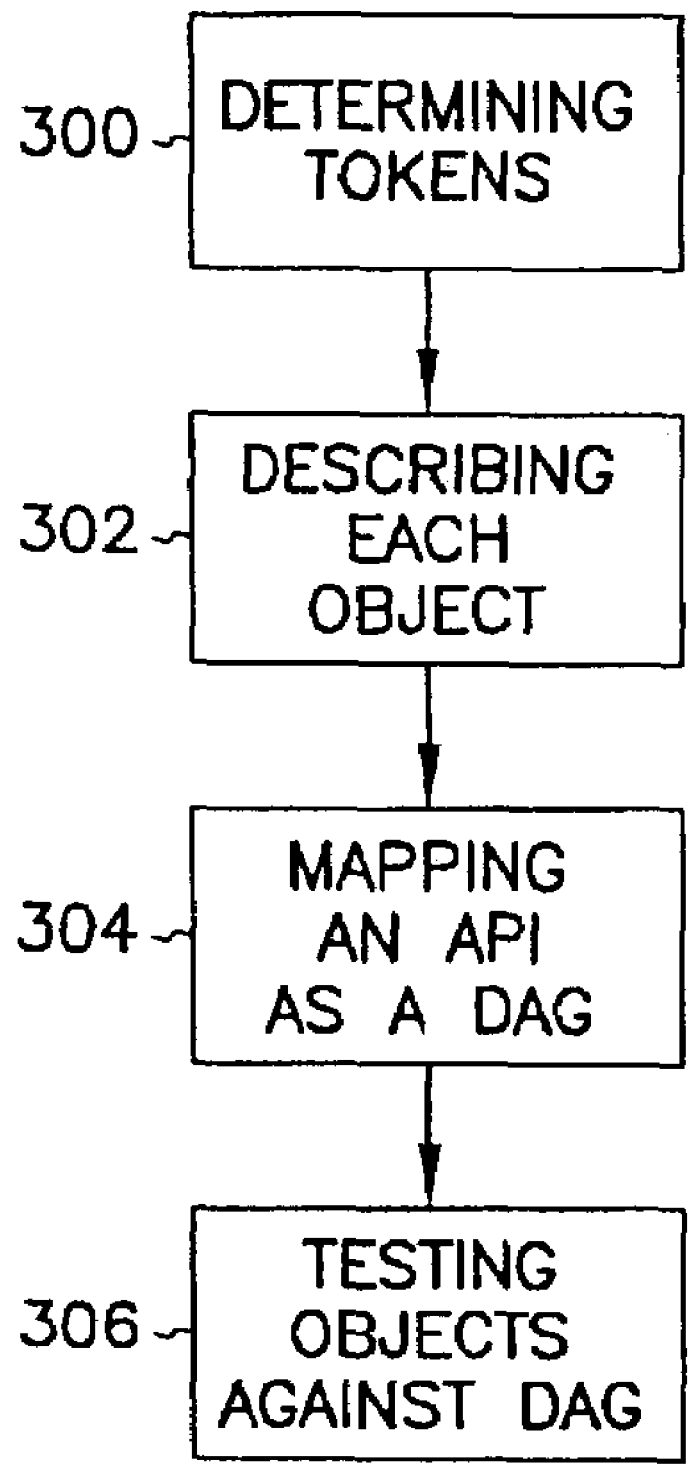

Referring now to FIG. 3, a flowchart of a method according to one embodiment of the invention is shown. In 300, a set of tokens is determined for a plurality of objects. Each token is mapped to a unique attribute of the objects, such as an object type, a parameter of the objects, etc. In 302, a description for each object is determined utilizing the set of tokens. In 304, a mapping of an API is determined, also utilizing the set of tokens. The mapping in one embodiment can be accomplished via mapping as a DAG, as has been described. Finally, in 306, an object is tested to determined whether it fits the API, by applying the description of the object against the mapping of the API, as has also been described.

CONCLUSION

Token-based object description has been described. Although specific embodiments have been illustrated and described herein, it will be appreciated by those of ordinary skill in the art that any arrangement which is calculated to achieve the same purpose, may be substituted for the specific embodiments shown. This application is intended to cover any adaptations or variations of the present invention. Therefore, it is manifestly intended that this invention be limited only by the following claims and equivalents thereof.

I claim:

1. A computer readable-medium having stored thereon a piece of software that is executable on a computer system, comprising:
    objects represented by a hierarchical tree structure;
    tokens, each relating to a unique attribute of an object, a sequence of tokens being indicative of a description of the object; and
    a program for recognizing an object of choice based on a description from the sequence of tokens, the program determining the object of choice by having nodes of a directed acyclical graph analyzing the sequence of tokens without referencing the hierarchical tree structure, wherein each node of the directed acyclical graph represents a micro computation, micro computation computing outcomes based on the description of the sequence of tokens, the outcome of each micro computation pointing to another node of the directed acyclical graph, wherein micro computations are selected from a group consisting of a compare fixed multiple micro computation, a compare float set micro computation, a compare float sequence micro computation, a switch multiple micro computation, a POSIX call succeeded micro computation, an OLE call succeeded micro computation, and a match succeeded on position n micro computation.

2. The piece of software of claim 1, wherein each unique attribute can be found in more than one object, the number of tokens being indicative of the number of unique attributes of the objects, the number of tokens being less than or equal to the number of attributes of the number of objects.

3. The piece of software of claim 1, wherein each micro computation examines a token of the sequence of tokens to determine whether the token represents the unique attribute of the object of choice.

4. The piece of software of claim 1, wherein the compare fixed multiple micro computation determines whether a token for describing a unique attribute of the object is at a particular position.

5. The piece of software of claim 1, wherein the compare float set micro computation determines whether a set of tokens for describing unique attributes of the object can be found at any position.

6. The piece of software of claim 1, wherein the compare float sequence micro computation determines whether the object has a given sequence of tokens and may have multiple successors indicating positions at which a match was found.

7. The piece of software of claim 1, wherein the switch multiple micro computation is an equivalent of the switch statement found in the C programming language with the value being the token at a given position.

8. The piece of software of claim 1, wherein the POSIX call succeeded micro computation is 0 or 1 depending whether or not a function returned with 0 or a nonzero value.

9. The piece of software of claim 1, wherein the OLE call succeeded micro computation is 0 or 1 depending whether or not the OLE-defined severity flag is 0 or nonzero.

10. The piece of software of claim 9, wherein the objects are selected from a group consisting of a resource provided by an operating system, a window, a segment of the computer memory, a hardware resource, a Java object, a Component Object Model (COM) object, a C++ object a parameter of an object a class, and a sub-class.

11. A computer-implemented method for recognizing objects, comprising:
    mapping an application programming interface to a directed acyclical graph, the application programming interface having a parameter whose type references objects;
    recognizing an object out of a number of objects in a hierarchical tree structure that would fit the parameter, the act of recognizing determining the object by having nodes of the directed acyclical graph analyze sequences of tokens without referencing the hierarchical tree structure, each token describing a unique attribute of an object; and representing a micro computation by each node of the directed acyclical graph, wherein micro computations are selected from a group consisting of a compare fixed multiple micro computation, a compare float set micro computation, a compare float sequence micro computation, a switch multiple micro computation, a POSIX call succeeded micro computation, an OLE call succeeded micro computation. and a match succeeded on position n micro computation.

12. The method of claim 11, further comprising computing outcomes, by micro computations, based on the description of the sequence of tokens, the outcome of each micro computation pointing to another node of the directed acyclical graph.

13. The method of claim 12, wherein the act of computing includes examining by each micro computation a token of the sequence of tokens to determine whether the token represents the unique attribute of the object.

14. A computer-readable medium having computer-executable instructions for performing a method for recognizing objects, the method comprising:

mapping an application programming interface to a directed acyclical graph, the application programming interface having a parameter whose type references objects;

recognizing an object out of a number of objects in a hierarchical tree structure that would fit the parameter, the act of recognizing determining the object by having nodes of the directed acyclical graph analyze sequences of tokens without referencing the hierarchical tree structure, each token describing a unique attribute of an object; and representing a micro computation by each node of the directed acyclical graph, wherein micro computations are selected from a group consisting of a compare fixed multiple micro computation, a compare float set micro computation, a compare float sequence micro computation, a switch multiple micro computation, a POSIX call succeeded micro computation, an OLE call succeeded micro computation. and a match succeeded on position n micro computation.

15. The computer-readable medium of claim 14, further comprising computing outcomes, by micro computations, based on the description of the sequence of tokens, the outcome of each micro computation pointing to another node of the directed acyclical graph.

16. The computer-readable medium of claim 15, wherein the act of computing includes examining by each micro computation a token of the sequence of tokens to determine whether the token represents the unique attribute of the object.

* * * * *